(12) United States Patent
Confalonieri (10) Patent No.: US 8,912,702 B2
(45) Date of Patent: Dec. 16, 2014

(54) PROCESS AND MOLD FOR PRODUCING FERROMAGNETIC CORES OF ELECTRIC MOTORS

(75) Inventor: Sergio Confalonieri, Cabiate (IT)

(73) Assignee: Ernesto Malvestiti S.p.A., Cinisello Balsamo (Milano) (IT)

( * ) Notice: Subject to any disclaimer, the term of this patent is extended or adjusted under 35 U.S.C. 154(b) by 405 days.

(21) Appl. No.: 13/266,574

(22) PCT Filed: Apr. 29, 2009

(86) PCT No.: PCT/IT2009/000193
§ 371 (c)(1),
(2), (4) Date: Oct. 27, 2011

(87) PCT Pub. No.: WO2010/125594
PCT Pub. Date: Nov. 4, 2010

(65) Prior Publication Data
US 2012/0056503 A1    Mar. 8, 2012

(51) Int. Cl.
| | |
|---|---|
| *H02K 1/18* | (2006.01) |
| *H02K 15/00* | (2006.01) |
| *H02K 1/14* | (2006.01) |
| *B21D 28/02* | (2006.01) |
| *B21D 45/00* | (2006.01) |
| *B21D 35/00* | (2006.01) |
| *H02K 15/02* | (2006.01) |

(52) U.S. Cl.
CPC ................ *H02K 1/148* (2013.01); *B21D 35/00* (2013.01); *H02K 15/02* (2013.01); *B21D 28/02* (2013.01); *B21D 45/003* (2013.01); *H02K 15/022* (2013.01)
USPC ............... 310/216.009; 310/216.048; 100/42; 100/48; 29/596; 29/598; 29/609; 29/738

(58) Field of Classification Search
CPC ...... B21D 28/02; B21D 35/00; B21D 45/003; H02K 1/148; H02K 15/02; H02K 15/022
USPC .............. 310/216.009, 216.048; 29/596, 598, 29/609, 732, 738; 100/42, 291
See application file for complete search history.

(56) References Cited

U.S. PATENT DOCUMENTS 4,619,028 A * 10/1986 Neuenschwander .......... 29/33 L
5,755,023 A *  5/1998 Neuenschwander ............ 29/596
(Continued)

FOREIGN PATENT DOCUMENTS

EP     0833427     4/1998
EP     0871282    10/1998
(Continued)

OTHER PUBLICATIONS

International Search Report for PCT/IT2009/000193 mailed Feb. 11, 2010.
(Continued)

*Primary Examiner* — John K Kim
(74) *Attorney, Agent, or Firm* — Nixon & Vanderhye P.C.

(57) ABSTRACT

A process and a blanking mold are described for the production of a ferromagnetic core for electric motors formed by a plurality of segments. The laminations are blanked from a sheet of ferromagnetic material and stacked in an accumulation chamber of the blanking mold, along which they advance until a segment constituted by a stack having a preset number of laminations is formed, which is mechanically connected to an adjacent segment, thereby forming a rectilinear sequence of segments. The segments are hinged to each other with the possibility of mutual rotation to allow the sequence of segments to be brought from the rectilinear condition to a closed circular configuration.

5 Claims, 10 Drawing Sheets

(56) References Cited

U.S. PATENT DOCUMENTS

| | | | |
|---|---|---|---|
| 5,799,387 A * | 9/1998 | Neuenschwander et al. | 29/598 |
| 6,219,900 B1 * | 4/2001 | Suzuki | 29/598 |
| 6,369,687 B1 * | 4/2002 | Akita et al. | 336/234 |
| 6,659,385 B2 * | 12/2003 | Akita et al. | 242/432.6 |
| 7,062,841 B2 * | 6/2006 | Neuenschwander | 29/609 |
| 8,205,320 B2 * | 6/2012 | Akita | 29/596 |
| 8,786,158 B2 * | 7/2014 | Neuenschwander et al. | 310/216.043 |
| 2003/0066183 A1 | 4/2003 | Nouzumi | |
| 2004/0064936 A1 * | 4/2004 | Neuenschwander | 29/609 |
| 2005/0229384 A1 * | 10/2005 | Yamamoto et al. | 29/598 |
| 2012/0056503 A1 * | 3/2012 | Confalonieri | 310/216.009 |

FOREIGN PATENT DOCUMENTS

| | | |
|---|---|---|
| EP | 0919306 | 6/1999 |
| EP | 0969581 | 1/2000 |
| EP | 1833145 | 9/2007 |

OTHER PUBLICATIONS

Written Opinion of the International Searching Authority for PCT/IT2009/000193 mailed Feb. 11, 2010.

\* cited by examiner

PROCESS AND MOLD FOR PRODUCING FERROMAGNETIC CORES OF ELECTRIC MOTORS

This application is the U.S. national phase of International Application No. PCT/IT2009/000193 filed 29 Apr. 2009 which designated the U.S., the entire contents of each of which are hereby incorporated by reference.

FIELD OF THE INVENTION

The present invention concerns a process and the associated blanking mold for the production of ferromagnetic cores for electric motors composed of lamination stacks and, in particular, of ferromagnetic cores composed of a plurality of stacks made in the form of separate segments mechanically connected to each other.

BACKGROUND OF THE INVENTION

It is known in the art to make ferromagnetic cores for electric motors by stacking a plurality of metal laminations. In particular, the cylindrical cores of the stators and rotors of these motors are made by blanking substantially ring-shaped laminations from a sheet of ferromagnetic material and then packing the laminations in a suitable number for obtaining a core with the desired axial length.

In particular, especially with regards to stator cores, the prior art also includes making the core in the form of a plurality of segments that are arranged according to a rectilinear sequence configuration to facilitate the winding of the coils around the respective field poles. Once the endings are completed, it must be possible to bend the rectilinear configuration to assume a closed-circle shape so that it can be inserted inside the shell or cylindrical casing of the electric motor.

For example, patent application EP-A1-0871282 describes a stator core wherein the rectilinear sequence of segments is obtained by blanking the laminations to simultaneously reproduce all of the shapes corresponding to the sections of the segments of the rectilinear sequence, and by keeping the shapes united along a deformable peripheral portion. In other words, the lamination stack leaving the blanking mold has the form of a rectilinear sequence of segments, in which each segment is connected to the adjacent segment by a thin deformable membrane.

Even though a suitable configuration is obtained to partially facilitate the subsequent winding of the coils, this solution has various drawbacks. First of all, because blanking work is along the linear development of the sequence of field poles, this solution limits the possibility of obtaining stator cores beyond a certain diameter.

Even if a blanking mold able to process sheets of large width was made, there is the risk of obtaining a not very satisfactory or totally unusable final result, mainly due to the differences in thickness that will inevitably be encountered in the sheets between the two side edges.

In addition, it should be borne in mind that the connection between the segments created with a thin membrane of unsheared material can be subject to breakage during the subsequent steps of coil winding, bending the core from the rectilinear configuration to the circular one and/or during the step of inserting the complete stator into the casing or shell of the motor. The winding of the coils could in fact require a fold between the segments in the opposite direction to that subsequently contemplated for taking the sequence from the rectilinear configuration to the circular configuration. Bending in different directions could thus cause the thin membranes that connect each segment to an adjacent segment to break.

Patent application EP-A1-0833427 describes another example of embodiment of a ferromagnetic core composed of a plurality of separate segments that can be mechanically connected to each other. Each lamination stack that constitutes a segment is made separately from the other segments of the same core. The laminations comprise at least one protruding engagement portion and at least one concave engagement portion having mutually complementary shapes to allow engagement with the respective engagement portions of adjacent laminations.

This document indicates how to work on a narrower sheet with respect to that known from the previous document. This also allows the various segments of a core to be assembled in a rectilinear configuration that can then be bent to give a circular configuration.

However, none of the various embodiments presented in this document proposes solutions suitable for avoiding relative axial sliding between adjacent segments. Furthermore, several of the proposed embodiments envisage the mechanical deformation of particularly thin engagement portions, which are difficult to produce with the necessary precision and are particularly delicate during the course of the subsequent steps of mechanical coupling between the segments, winding the coils and bending the core into the circular configuration.

In theory, this solution should also allow the creation of a single, continuous winding, namely by using a continuous coated or enameled conductor that extends without interruption to form all of the coils of the field poles. Even if this could give sufficient cohesion to all the segments of the stator core during bending from the rectilinear configuration, in which the single continuous winding of all coils is carried out, to the closed circular configuration suitable for being housed in the shell or casing of a motor, any break in the protruding engagement portions of the segments subjected to deformation would result in discarding the entire stator and, in consequence, an undesired increase in production costs.

Besides the solutions proposed by application EP-A1-0833427, this document underlines a particularly important aspect in the manufacture of ferromagnetic cores made in the form of segments mechanically coupled to each other. In fact, in order to reduce the magnetic reluctance of the core as much as possible, clearance between the various segments, and in particular between the respective protruding and concave engagement portions, must be reduced to the minimum. However, this requires high machining precision and also high fitting force on the engagement portions of the segments when they are coupled together.

SUMMARY OF THE INVENTION

That having been said, a general object of the present invention is that of making available a process and a blanking mold for the production of a ferromagnetic core for electric motors formed by a plurality of segments that allow the limits of the known art to be overcome.

One particular object of the present invention is that of making available a process and a blanking mold of the above-identified type that facilitate the winding of the coils on the segments of the stator core without problems arising in the mechanical connections between the segments in the winding step or in the subsequent steps of bending the ferromagnetic core and/or its fitting in the casing or shell of the electric motor.

Another particular object of the present invention is that of making available a process and a blanking mold of the above-identified type that allow a segmented ferromagnetic core to be embodied with reduced magnetic reluctance with respect to the known art.

These and other objects are achieved by the present invention, which concerns a process according to claim 1 for the production of a ferromagnetic core for electric motors formed by a plurality of segments, as well as a blanking mold according to claim 7 for embodying this process. Further peculiar features of the present invention are specified in the respective dependent claims.

The process forming the subject of the present invention essentially comprises the steps of:
 i) blanking a plurality of laminations from a sheet of ferromagnetic material in a blanking mold, at least some of the laminations comprising at least one protruding engagement portion and at least one concave engagement portion having mutually complementary shapes to allow engagement with the respective engagement portions of adjacent laminations,
 ii) progressively stacking the laminations in an accumulation chamber of the blanking mold, and
 iii) forming a plurality of segments of the ferromagnetic core consisting of stacks having a preset number of stacked laminations.

The process according to the present invention usefully includes the step of directly forming a rectilinear sequence of adjacent segments in the blanking mold that are mechanically connected to each other by coupling the protruding engagement portions of the laminations of a segment with the concave engagement portions of the laminations of another adjacent segment.

In practice, the mechanical coupling between the segments is carried out directly in the blanking mold, thus providing the necessary rectilinear sequence in output for facilitating the subsequent step of winding the coils on each field pole.

The segments are formed and progressively connected to each other during the advancement of the stacked laminations in the accumulation chamber. This allows a high mechanical coupling force to be exerted between adjacent segments inside the blanking mold. The engagement portions between the segments can thus be machined with high precision as well and, in consequence, it is possible to considerably reduce the magnetic reluctance of the core formed by the separate segments.

Moreover, the lamination segments are connected to each other in a way such that each segment can usefully rotate with respect to an adjacent segment around an axis passing through the protruding engagement portions and without any possibility of a segment axially sliding with respect to an adjacent segment.

In practice, excluding the outermost segments of the rectilinear sequence, which will later be simply moved close together, each lamination stack of the intermediate segments includes one or more laminations devoid of concave engagement portions in the lower part, while on the upper part one or more laminations are provided that have a protruding engagement portion which is subjected to plastic deformation and interference-fit coupled to the concave engagement portion of at least one lamination of a stack or adjacent segment.

In a possible embodiment of the process according to the present invention, the laminations are blanked in a position of the blanking mold that is different from the position in which they are stacked in the accumulation chamber. In other words, a "push back" technique is used, whereby a blanked lamination is repositioned on the sheet in the feed phase for subsequent extraction from the same sheet and stacked at a station following that in which the punch and blanking mold for the final shape are present.

For carrying out the process according to the present invention, a blanking mold is provided that comprises:
 a) at least one blanking station for blanking a plurality of laminations from a sheet of ferromagnetic material, at least some of the laminations comprising at least one protruding engagement portion and at least one concave engagement portion having mutually complementary shapes to allow engagement with the complementary engagement portions of adjacent laminations, and
 b) at least one stacking station comprising an accumulation chamber to progressively stack the laminations and to form a plurality of segments of the ferromagnetic core constituted by stacks having a preset number of stacked laminations.

The blanking mold usefully comprises at least one forming station that allows directly forming a rectilinear sequence of adjacent segments in the blanking mold that are mechanically connected to each other by coupling the protruding engagement portions of the laminations of a segment with the concave engagement portions of the laminations of another adjacent segment.

The forming station is placed beneath the stacking station to progressively receive the segments and connect them together during the advancement of the stacked laminations in the accumulation chamber.

The forming station is provided with at least one mobile conveyor on which the rectilinear sequence of segments of the partially-manufactured core are placed.

In correspondence to or close to the forming station, a punching station is also provided that allows at least one protruding portion of at least one of the laminations of each stack to be plastically deformed for coupling it with interference fit to the concave engagement portion of at least one lamination of an adjacent segment.

According to the present invention, a ferromagnetic core for an electric motor is also made available, and in particular a stator core formed by a plurality of segments mechanically coupled to each other, wherein each segment is formed by a stack of a plurality of laminations, and wherein some laminations comprise at least one protruding engagement portion and at least one concave engagement portion having mutually complementary shapes to allow engagement with the complementary engagement portions of adjacent laminations.

The core is advantageously made in a blanking mold in the form of a rectilinear sequence of adjacent segments mechanically connected to each other by coupling the protruding engagement portions of the laminations of a segment with the concave engagement portions of the laminations of another adjacent segment.

BRIEF DESCRIPTION OF THE DRAWINGS

Further characteristics and advantages of the present invention shall become clearer from the description that follows, made by way of non-limitative example with reference to the enclosed schematic drawings, where.

MODES FOR CARRYING OUT THE INVENTION

Figure 1:
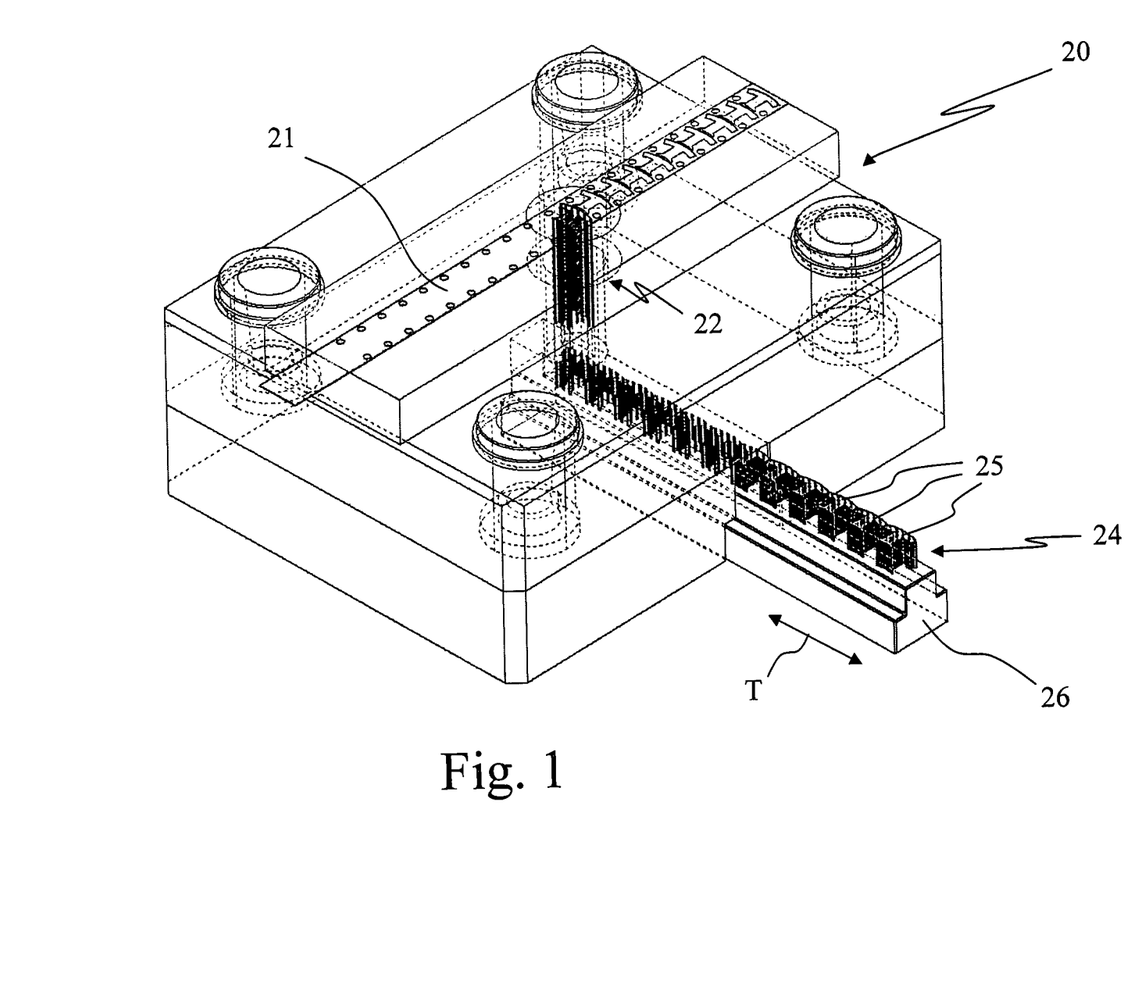
FIG. 1 is a perspective view, partially transparent, of some parts of a blanking mold according to a possible embodiment of the present invention.
Figure 2:
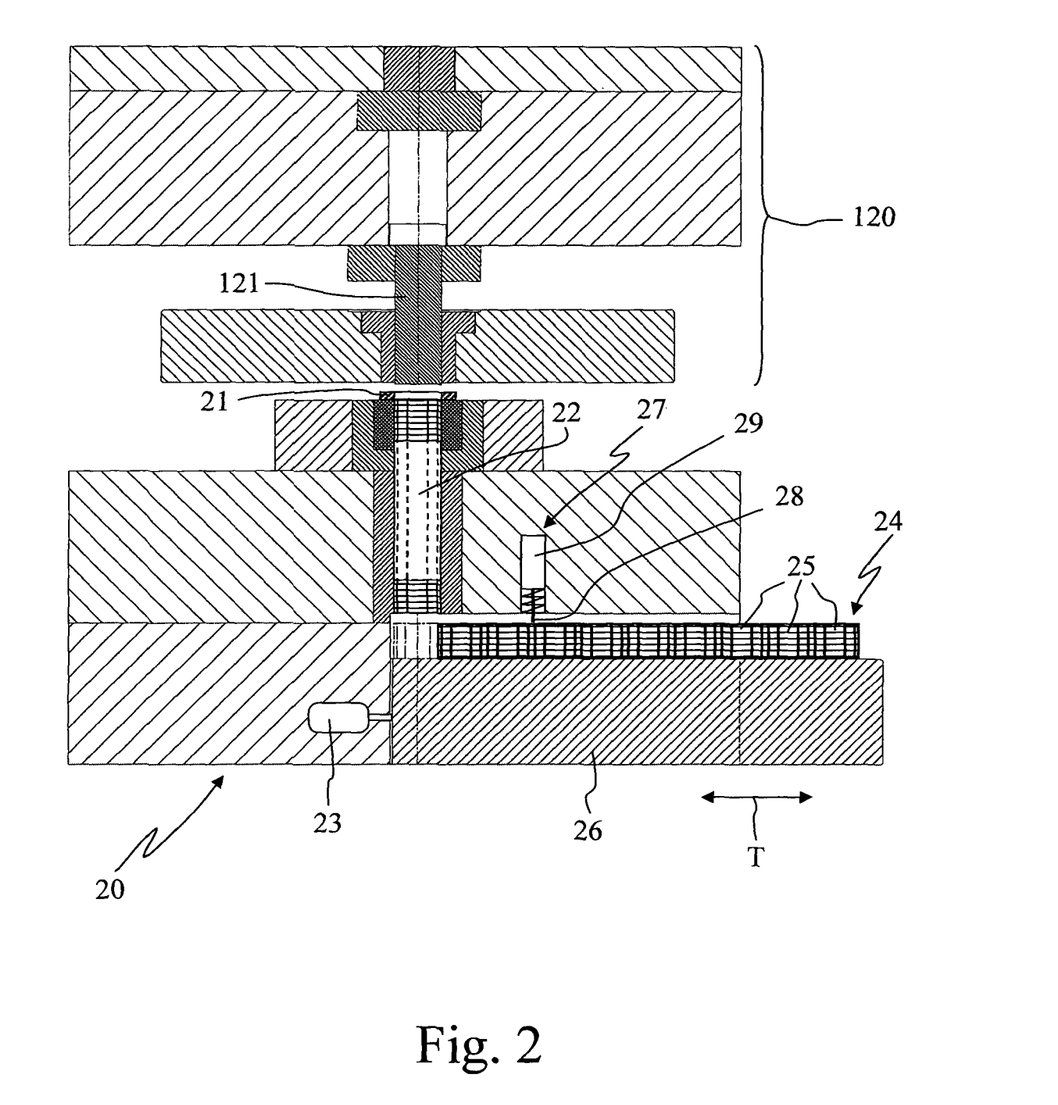
FIG. 2 is a cross-section view of the portion of the blanking mold shown in FIG. 1 and of other components of the blanking mold.

In FIGS. 1 and 2, a portion of a blanking mold 20 is shown in which a sheet 21 of ferromagnetic material is blanked to obtain a plurality of laminations that constitute the segments of the ferromagnetic core.

In FIG. 2, the mobile part 120 of the blanking mold 20 is also shown, in a position removed from its effective position for reasons of clarity and, for the same reasons, sheet 21 is also shown with a greater thickness with respect to its effective thickness. An suitably shaped punch 121 is present in the mobile part 120 that, on each descent cycle of the mobile part 120, allows the laminations to be extracted from the sheet 21 and stacked in the blanking mold 20.

The laminations extracted from the sheet 21 are progressively stacked in an accumulation chamber 22 and pushed downwards to form the segments 25 in the form of stacks having a preset number of stacked laminations.

In the lower part of the accumulation chamber 22, a forming station is provided in which a rectilinear sequence 24 composed of adjacent segments 25 mechanically connected to each other is formed. In practice, the progressive advancement of the laminations in the accumulation chamber 22 allows the laminations of a stack in the course of formation to be mechanically connected to the adjacent segment arranged in a suitable position in the forming station.

In fact, as shall be explained in greater detail hereunder, at least some of the laminations comprise at least one protruding engagement portion and at least one concave engagement portion having mutually complementary shapes: the mechanical connection is effected by coupling the protruding engagement portions of the laminations of a segment with the concave engagement portions of the laminations of another adjacent segment.

The rectilinear sequence 24 composed of segments 25 mechanically connected to each other is arranged on a mobile conveyor 26 that is operated with rectilinear motion in both directions, indicated by the double arrow T, via an actuator 23, for example a stepper motor or similar.

The conveyor 26 is moved, for example, in a first direction and kept in position at a standstill until the completion of a stack with the preset number of laminations, then it is made to advance in the same direction for a preset length so as to receive the next lamination stack that will be mechanically connected to the previous stack, and so on until the completion of a complete rectilinear sequence 24 composed of the desired number of segments 25. Once the just-completed sequence 24 is removed, the mobile conveyor 26 returns in the opposite direction and stops in a suitable position to receive the first lamination stack of the next sequence.

Inside the blanking mold 20, a punching station 27 is also provided, in which a punch 28 operated by a hydraulic or pneumatic actuator 29 is provided to plastically deform at least one protruding engagement portion of at least one of the laminations of each stack. This allows the interference-fit coupling of the protruding engagement portion of a lamination to the concave engagement portion of at least one adjacent lamination in order to prevent mutual axial movement between two adjacent segments 25.

Figure 3:
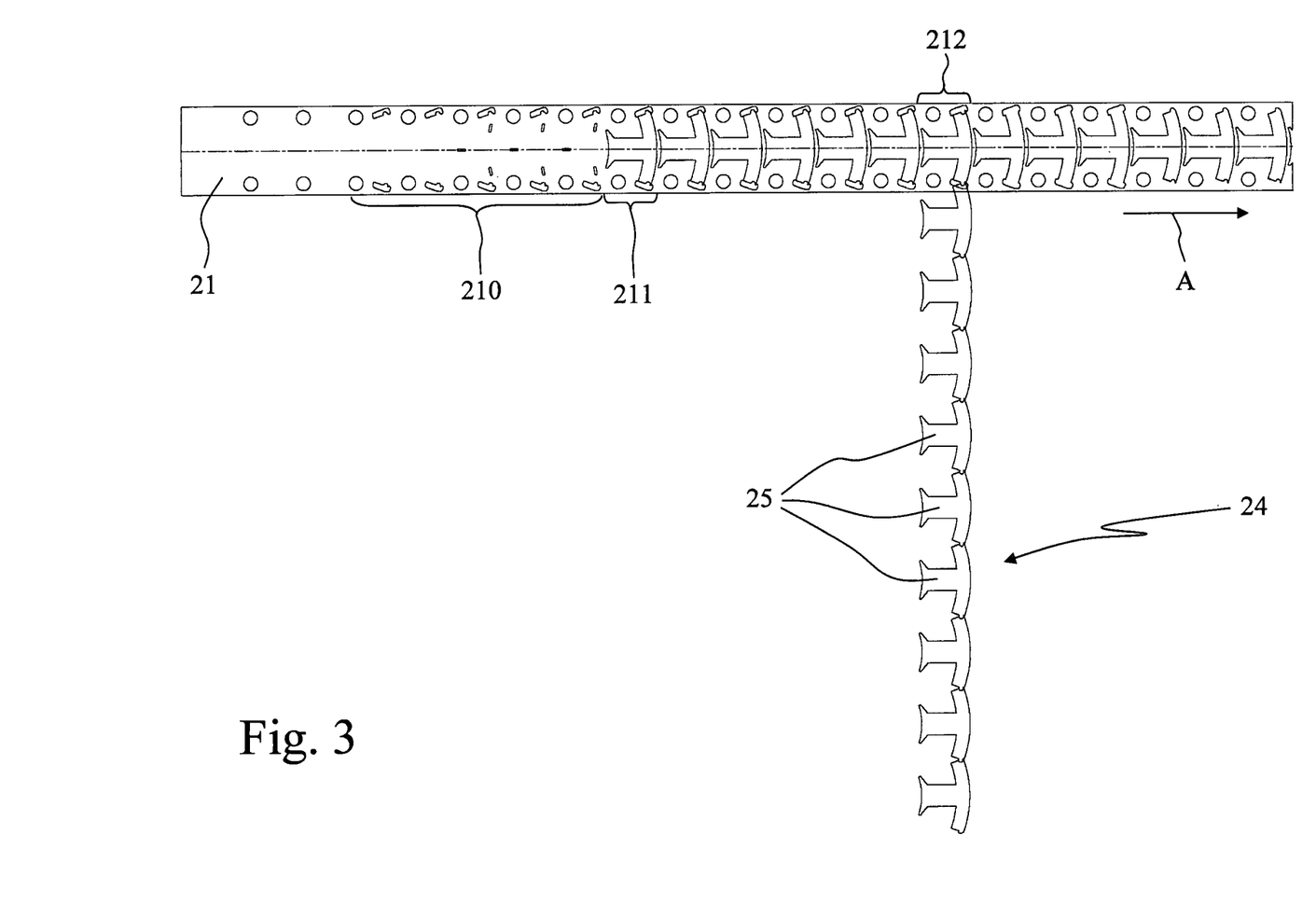
FIG. 3 is a plan view that schematically shows the machining of the sheet to obtain the segments constituted by the lamination stacks.

FIG. 3 schematically shows, by way of example, some of the processing steps of the sheet 21, which is fed through the blanking mold 20 in the direction indicated by arrow A, and the layout that the rectilinear sequence 24 of segments 25 assumes with respect to the sheet 21.

In the blanking steps, generally indicated by reference numeral 210, corresponding to a like number of distinct blanking stations, certain internal portions common to all laminations are removed and the coupling or engagement profiles of the various types of laminations are defined.

In correspondence to the blanking step or station 211, the complete lamination with its final shape is cut and immediately repositioned in the sheet 21 using a "push back" technique. This allows the finished lamination to be transported to step 212, where the lamination is extracted from the sheet 21 for insertion into the underlying accumulation chamber 22 (FIGS. 1 and 2).

Figure 4:
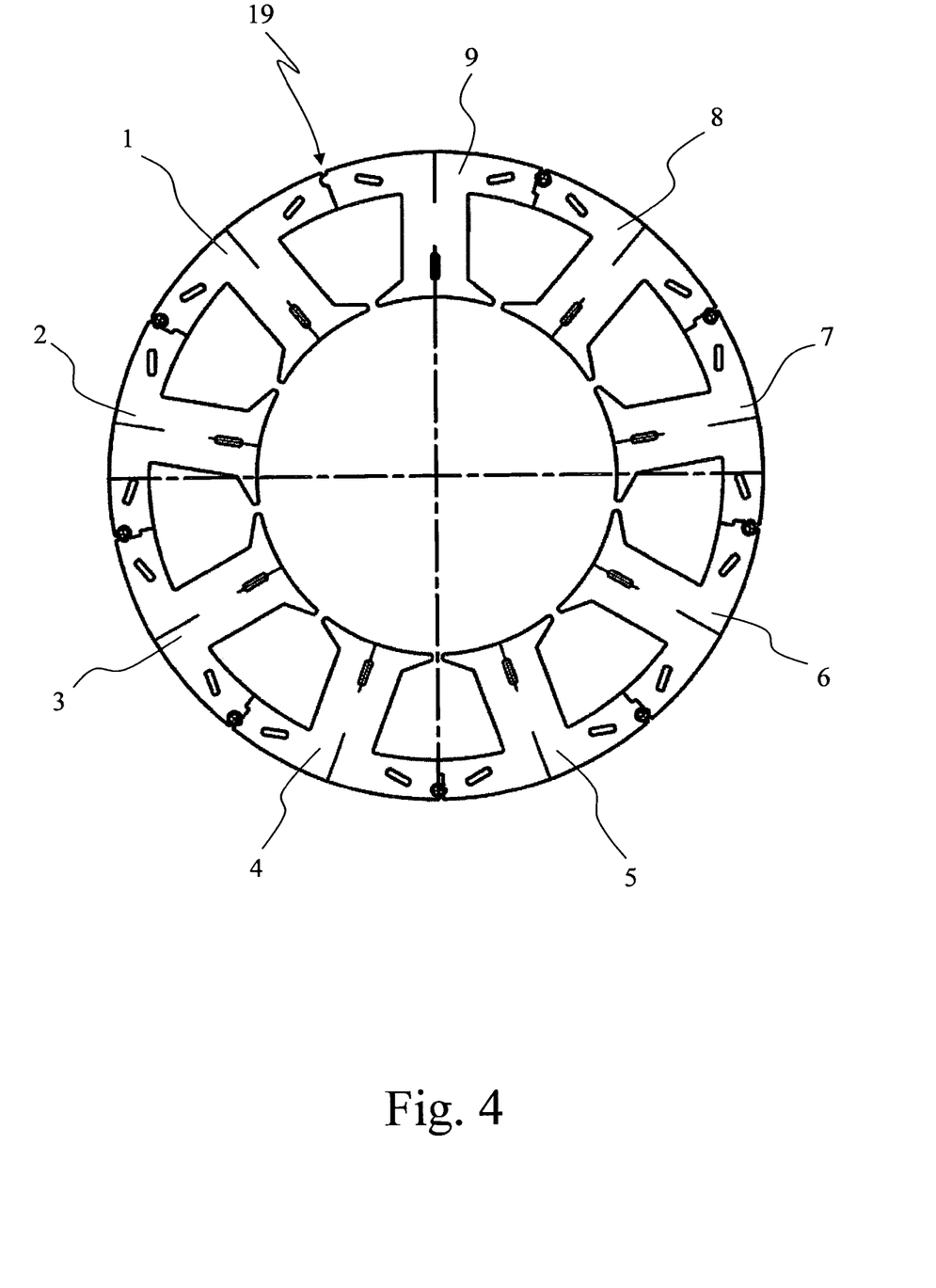
FIG. 4 is a plan view that shows a possible embodiment of a ferromagnetic stator core according to the present invention.

FIG. 4 shows the composition of a ferromagnetic stator core comprising nine separate segments, numbered 1 to 9, which is obtained by bending a sequence in a rectilinear configuration, such as that indicated by reference numeral 24 in FIGS. 1 to 3, into a closed circular configuration.

In general, all segments are mechanically connected to each other so as to guarantee the possibility of rotation of a segment relative to an adjacent segment, with the sole exception of joint 19 between segment 1 and segment 9, in correspondence to which coupling portions are provided that have just a mutually complementary form, but without any mechanical connection between them.

Each segment of the core in FIG. 4 is made in the form of a lamination stack in which various types of engagement or coupling portions are present in function of the positions of the laminations within the stack and the position of the segment within the ferromagnetic core.

Figure 5:
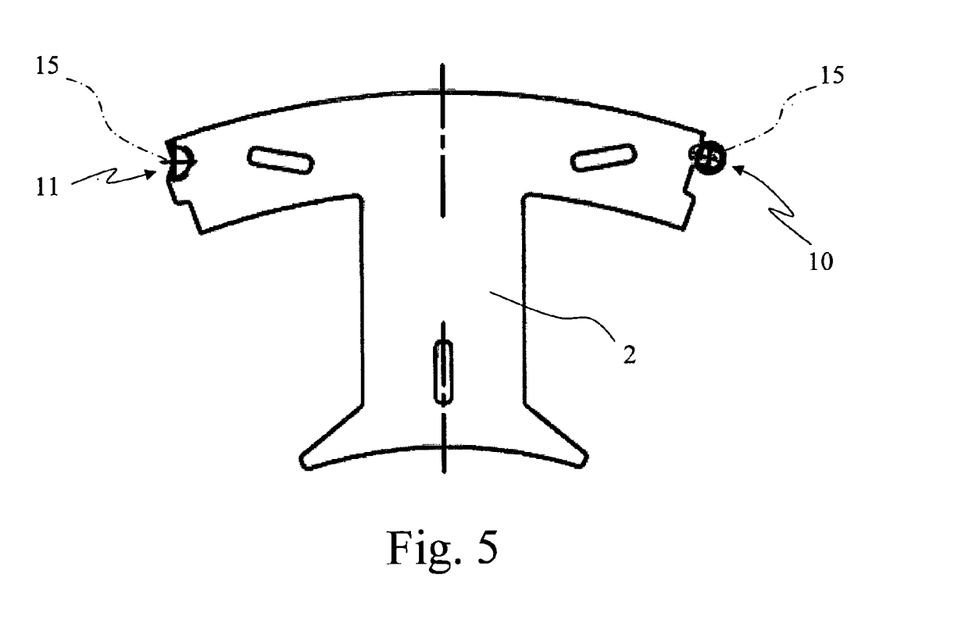
FIG. 5 is a plan view that separately shows one of the segments of the core in FIG. 4.

FIG. 5 shows an enlarged view of segment 2, which is identical to the segments identified by reference numerals 3 to 8 of the core in FIG. 4. That which is specified hereunder for segment 2 should therefore be considered valid for the segments numbered 3 to 8 as well. FIG. 5 shows, in particular, a protruding engagement portion 10 and a concave engagement portion 11, as well as the axes of rotation 15 of segment 2 with respect to any adjacent segment.

Figure 5A:
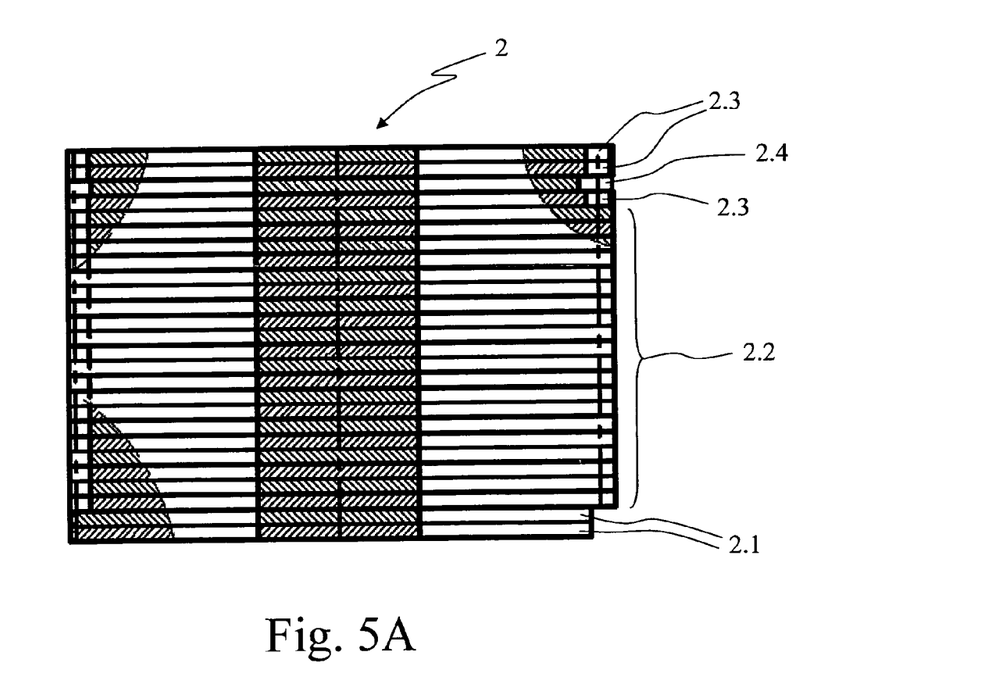
FIG. 5A is an elevation view, with partial section, which shows the composition of the lamination stack that constitutes the segment in FIG. 5, FIGS. 5B to 5E show the various types of laminations present in the segment in FIG. 5.

FIG. 5A shows, by way of example, a possible arrangement of the lamination stack of segment 2, with each type of lamination present in the stack being shown in FIGS. 5B-5E. These Figures highlight the various types of protruding engagement portions 10c, 10d, 10e of a generally circular shape, the respective concave engagement portions 11g, 11h, as well as any special configurations in which there is just a hint of the engagement portions, for example, the ends 10b and 11f (FIG. 5B) of the bottom laminations 2.1 of the stack that constitutes segment 2.

Figure 5B:
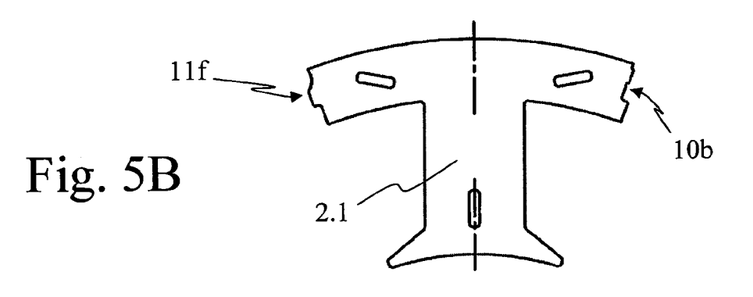
Figure 5C:
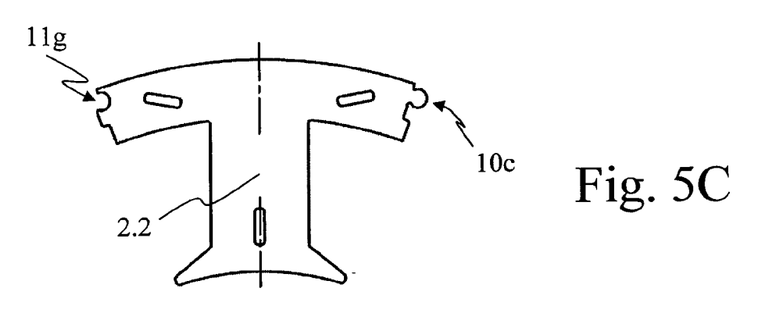
Figure 5D:
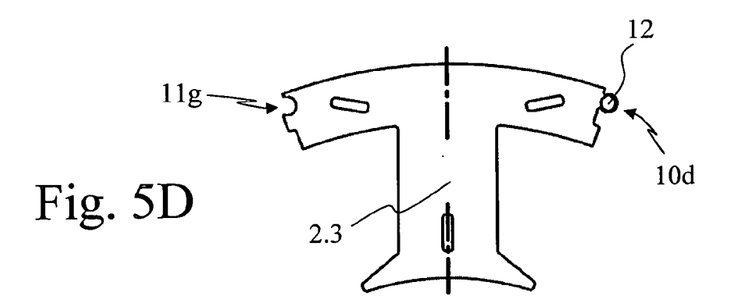

Starting from the top laminations of the stack in FIG. 5A and descending to the bottom, the lamination stack that constitutes segment 2 includes two laminations indicated by reference numeral 2.3 in FIG. 5D. The protruding engagement portion 10d of lamination 2.3 contains a hole 12 to allow the passage of the punch 28 (FIG. 2) that will plastically deform the protruding engagement portion 10e of the third lamination of the stack indicated by reference numeral 2.4 and shown in detail in FIG. 5E.

Figure 5E:
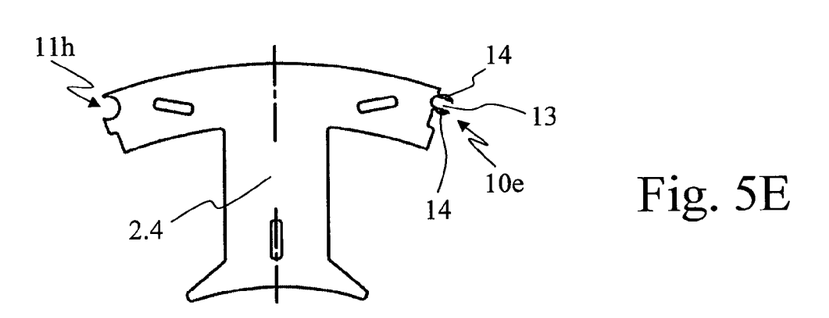

In particular, the protruding engagement portion 10e, also of a circular shape, includes a radial cut 13 that separates the protruding engagement portion 10e into two tongues 14. The punch 28, penetrating through the holes 12 of the overlying laminations, plastically deforms the engagement portion 10e, moving the tongues 14 away from each other so as to couple them with an interference fit to the inner walls of concave portion 11h of an adjacent lamination. This usefully prevents axial sliding between adjacent segments without, however, preventing their mutual rotation. A fourth lamination 2.3, namely one equipped with a protruding engagement portion 10d with a hole 12, is placed immediately beneath lamination 2.4 to offer the punch 28 the necessary travel to effectively stretch the tongues 14 apart.

The main type of laminations in the stack in FIG. 5A is that identified by reference numeral 2.2 in FIG. 5C. These laminations, arranged in the central positions of the stack, include a protruding engagement portion 10c of substantially circular shape and with a suitable size for it to be housed in a concave engagement portion 11g of a lamination belonging to an adjacent segment. In this way, the engagement between two adjacent segments is such as to prevent the separation of the segments if subjected to a rectilinear tractive force parallel to the development of the rectilinear configuration, whilst still allowing mutual rotation as already described earlier on.

In the bottom part, for example, two laminations are provided with ends shaped according to the shape identified by reference numeral 2.1 and shown in FIG. 5B. In these laminations, proper engagement portions able to guarantee mechanical connection between adjacent segments are not present, but only an end 11f, without a proper concave portion, which is overlapped by the protruding end portion 10c of a lamination 2.2 belonging to the group of central laminations of the stack of an adjacent segment. In the same way, portion 10b of laminations 2.1, although having a complementary shape to the opposite portion 11f, is shaped so as to leave the necessary space to ensure that the protruding portion 10c of a lamination of the same segment 2 can overlap portion 11f of an adjacent segment.

Figure 6:
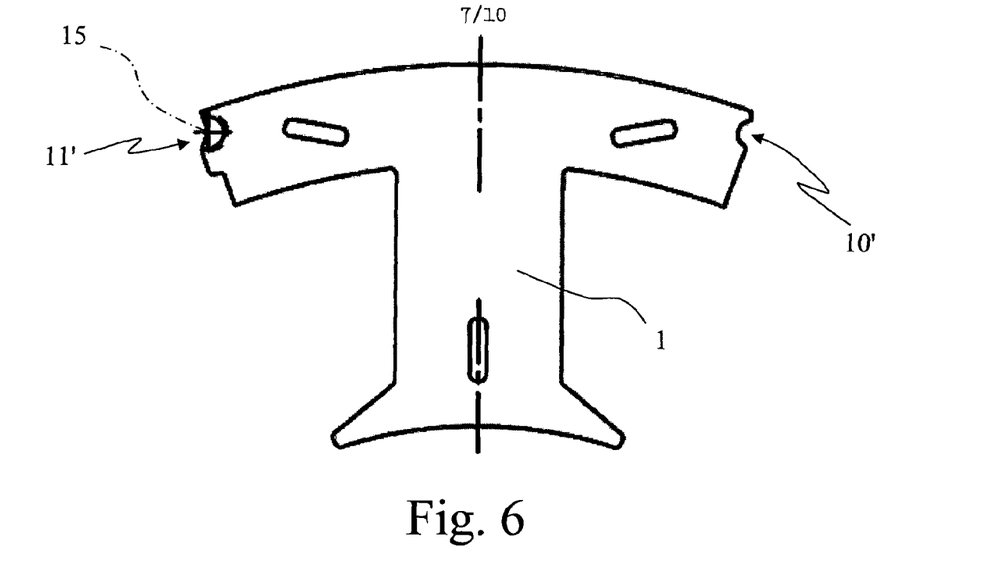
FIG. 6 is a plan view that separately shows another of the segments of the core in FIG. 4.

FIG. 6 shows an enlarged view of segment 1, designed to be coupled in 19 to segment 9 in the closed circular configuration in FIG. 4. In this case, segment 1 has a slightly concave coupling portion 10' to accommodate the slightly convex portion 11" (FIG. 7) present on segment 9, while a concave engagement portion 11', similar to that identified by reference numeral 11 in FIG. 5 for segment 2, is provided on the opposite side. In consequence, an axis of rotation 15 is only indicated in correspondence to portion 11', to underline the fact that a mechanical connection with the possibility of rotation only occurs with adjacent segment 2, while adjacent segment 9 only rests against portion 10'.

Figure 6A:
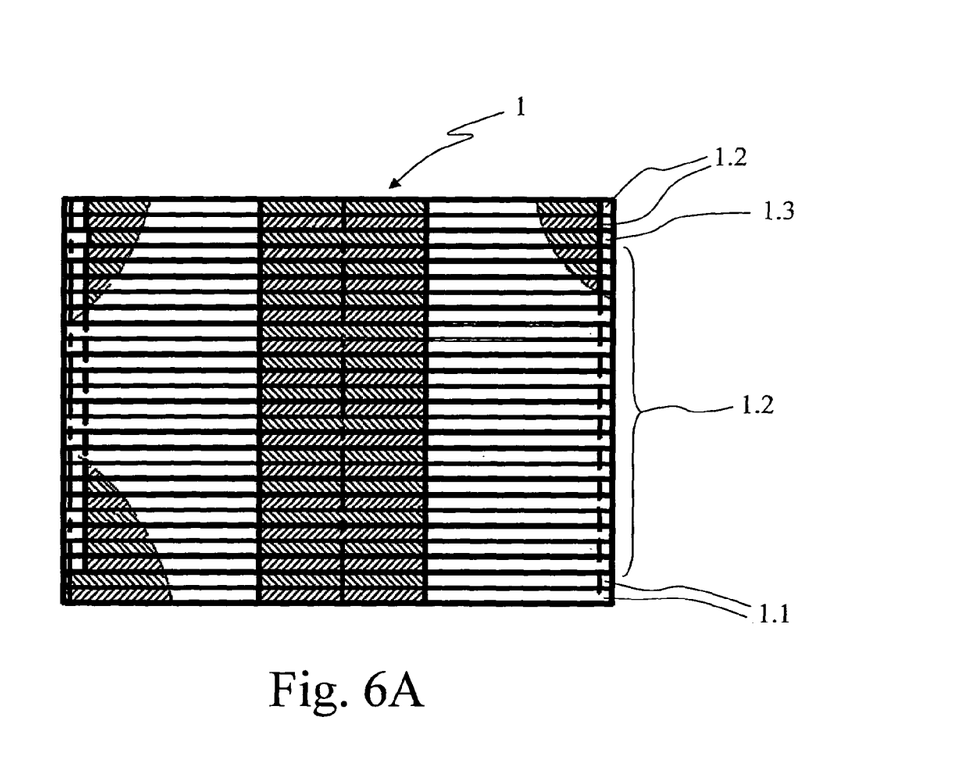
FIG. 6A is an elevation view, with partial section, which shows the composition of the lamination stack that constitutes the segment in FIG. 6, FIGS. 6B to 6D show the various types of laminations present in the segment in FIG. 6.
Figure 6B:
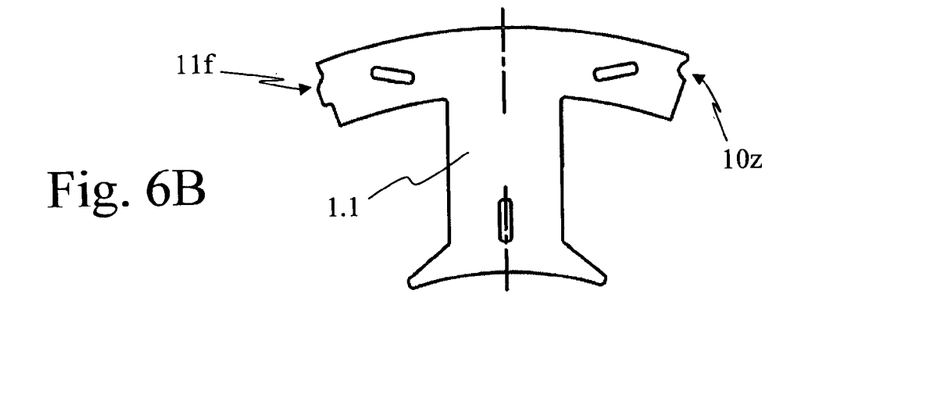
Figure 6C:
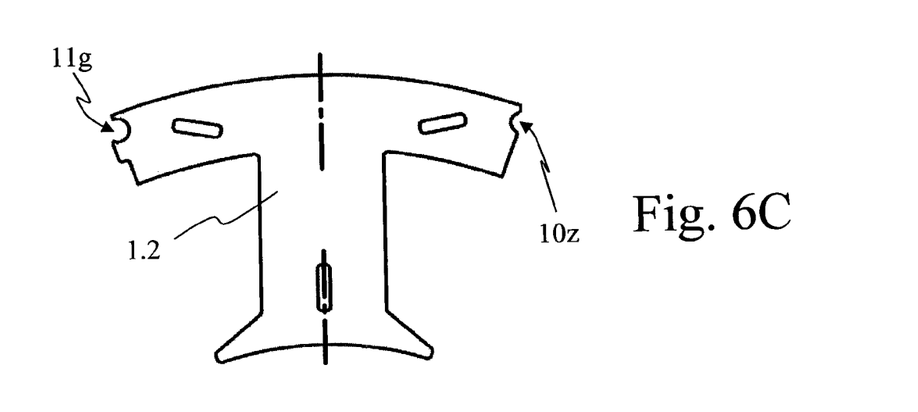
Figure 6D:
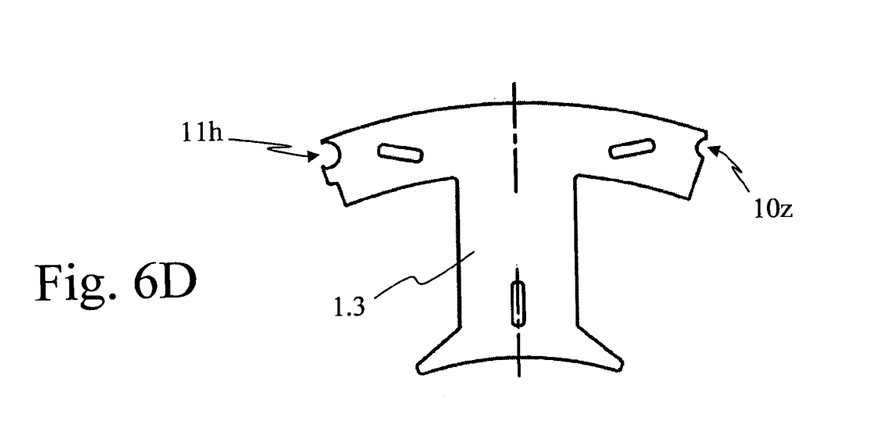

FIG. 6A shows, by way of example, a possible arrangement of the lamination stack of segment 1, with each type of lamination present in the stack being shown in FIGS. 6B-6D. On the side of coupling portion 10' with segment 9, all lamination types 1.1, 1.2 and 1.3 have the same slightly concave portion 10z, while concave engagement portions 11g and 11h are present on the opposite side of laminations 1.2 and 1.3, as is a portion 11f on lamination 1.1, which corresponds to that already shown with reference to FIG. 5B.

Starting from the top laminations of the stack in FIG. 6A and descending to the bottom, the lamination stack that constitutes segment 1 includes two laminations indicated by reference numeral 1.2, shown in FIG. 6C, which also constitute the predominant type of laminations present in the central part of the stack. A lamination 1.3 (FIG. 6D) is inserted between the first two laminations 1.2 and the remaining identical laminations of the central part of the stack that includes a concave engagement portion 11h of suitable shape and size to receive the engagement portion 10e of a lamination of an adjacent segment, in particular of segment 2, which is subjected to plastic deformation.

In the bottom part, two laminations are provided with ends shaped according to the shape identified by reference numeral 1.1 in FIG. 6B. This type of lamination has an end 11f identical to that already described for the lamination in FIG. 5B, while the concave coupling portion 10z is identical to that of all the other laminations of stack 1, namely a concave portion having a complementary shape and size to convex portion 11a of the laminations of segment 9, which is described below with reference to FIGS. 7 and 7A-E.

Figure 7:
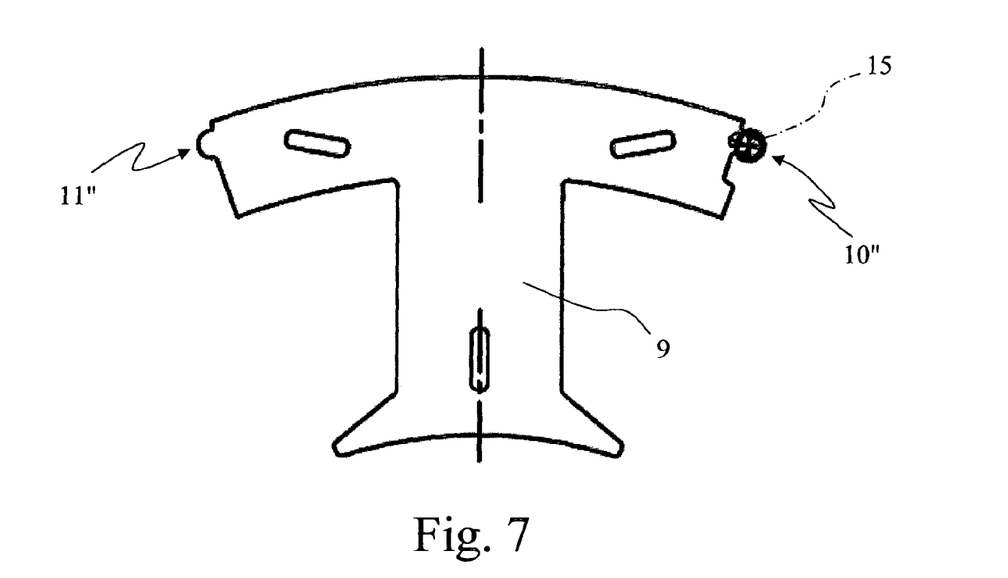
FIG. 7 is a plan view that separately shows a further segment of the core in FIG. 4.

FIG. 7 shows an enlarged view of segment 9 designed to be coupled in 19 to segment 1 in the closed circular configuration in FIG. 4. Segment 9 is therefore equipped with a slightly convex coupling portion 11" that couples with a slightly concave portion 10' of segment 1 (FIG. 6), while a protruding engagement portion 10" similar to that identified by reference numeral 10 in FIG. 5 for segment 2, is provided on the opposite side. An axis of rotation 15 is therefore only indicated in correspondence to portion 10", to underline the fact that a mechanical connection with the possibility of rotation only occurs with adjacent segment 8, while adjacent segment 1 only rests against portion 11".

Figure 7A:
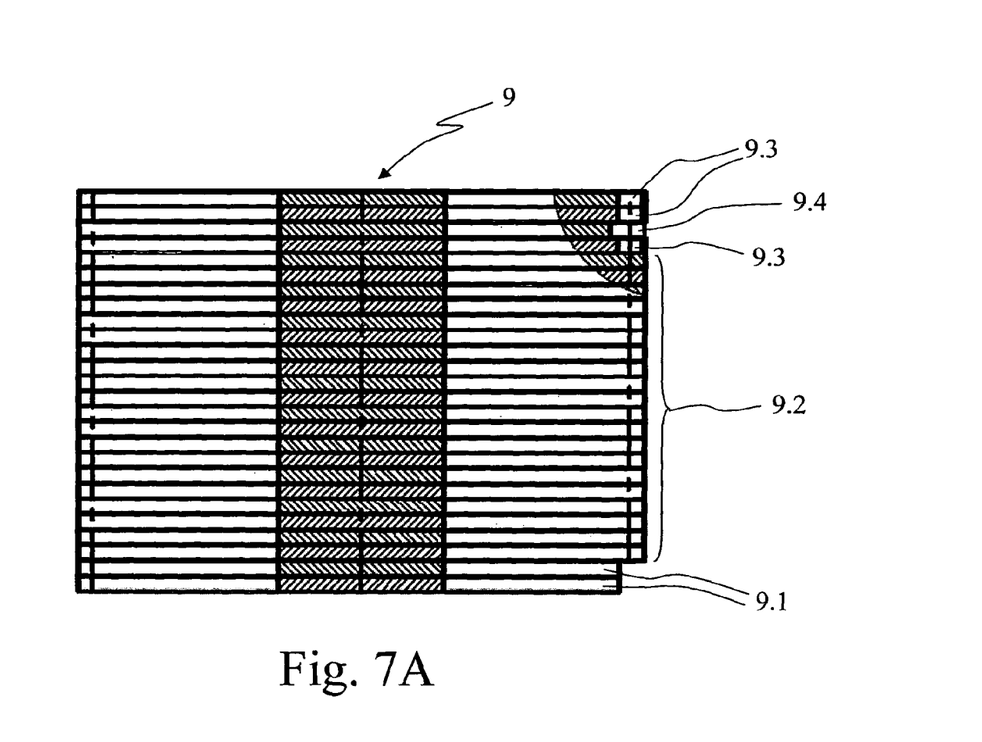
FIG. 7A is an elevation view, with partial section, which shows the composition of the lamination stack that constitutes the segment in FIG. 7, and FIGS. 7B to 7E show the various types of laminations present in the segment in FIG. 7.

FIG. 7A shows, by way of example, a possible arrangement of the lamination stack of segment 9, with each type of lamination present in the stack being shown in FIGS. 7B-7E. Similarly to the laminations that form stack 2, the various types of protruding engagement portions 10c, 10d, 10e are highlighted, while only one type of convex portion 11a is present on the opposite part, which will constitute portion 11" of segment 9.

Figure 7B:
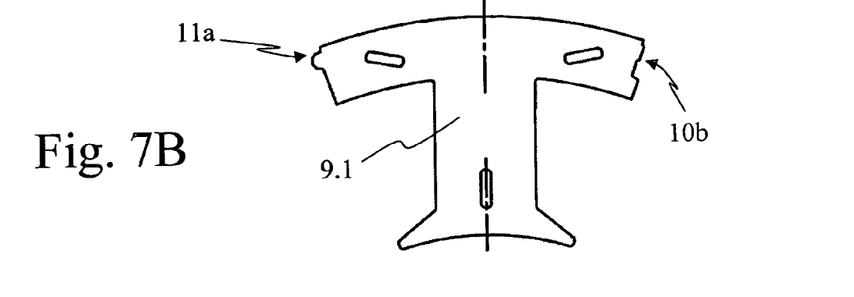
Figure 7C:
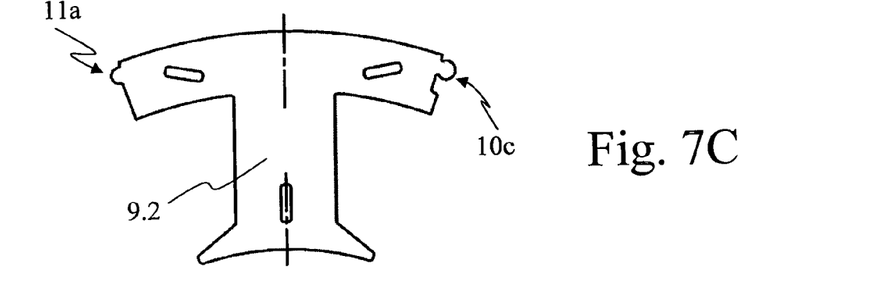
Figure 7D:
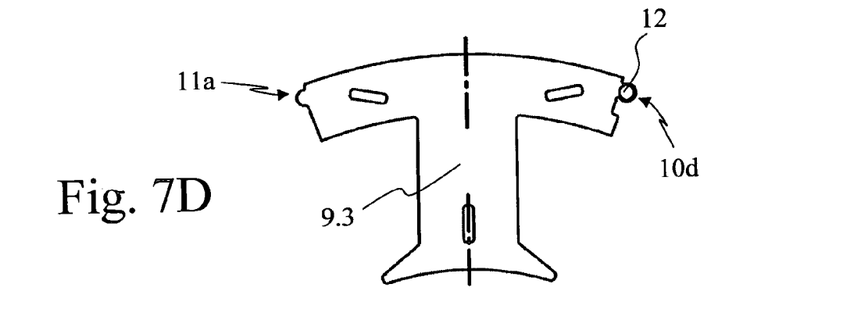
Figure 7E:
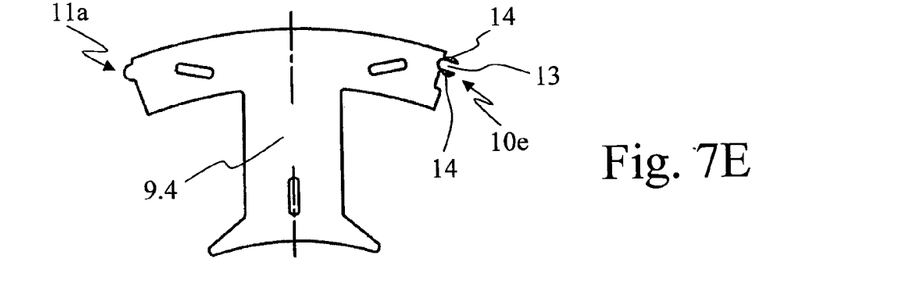

Starting from the top laminations of the stack in FIG. 7A and descending to the bottom, the lamination stack that constitutes segment 9 includes two laminations indicated by reference numeral 9.3 in FIG. 7D. Similarly to that already shown for the laminations of segment 2, the protruding engagement portion 10d of lamination 9.3 contains a hole 12 to allow the passage of the punch 28 (FIG. 2) that will plastically deform the protruding engagement portion 10e of the third lamination of the stack indicated by reference numeral 9.4 and shown in detail in FIG. 7E.

In the same way, to prevent axial sliding between adjacent segments without, however, preventing their mutual rotation, the protruding engagement portion 10e includes a radial cut 13 that separates the protruding engagement portion 10e into two tongues 14. The punch 28, penetrating through the holes 12 of the overlying laminations, plastically deforms engagement portion 10e, moving the tongues 14 away from each other so as to couple them with an interference fit to the inner walls of the concave portion 11h of the adjacent lamination, namely that indicated by reference numeral 8 in FIG. 4. A fourth lamination 9.3, namely one equipped with a protruding engagement portion 10*d* with a hole 12, is placed immediately beneath lamination 9.4 to offer the punch 28 the necessary travel to effectively stretch the tongues 14 apart.

The predominant type of laminations in the stack in FIG. 7A is that identified by reference numeral 9.2 in FIG. 7C. In this case as well, the laminations arranged in the central positions of the stack include a protruding engagement portion 10*c* of a substantially circular shape and size suitable for being housed in a concave engagement portion 11*g* of a lamination belonging to an adjacent segment 8.

Two laminations are provided on the bottom part that have ends shaped according the shape identified by reference numeral 9.1 and shown in FIG. 7B. In these laminations, portion 10*b* has a complementary shape to that of 11*f* of lamination 2.1 in FIG. 5B, while the opposite portion 11*a* has a complementary shape to that indicated by 10*z* for laminations 1.1-1.3 of segment 1. The functions of each shape shown therein are the same as those already illustrated for the corresponding shapes of the laminations belonging to segments 1 and 2.

Various modifications can be made to embodiments shown herein by way of example without leaving the scope of the present invention. For example, the rectilinear sequence that constitutes a ferromagnetic core could be composed of segments of two different shapes mechanically connected to each other and arranged in an alternative manner. Furthermore, the shapes, arrangements of the laminations in the stack and the number and/or positions of their deformable portions could also be different from those shown herein.

The invention claimed is:

1. A blanking mold for the production of a ferromagnetic core for electric motors formed by a plurality of separate segments, each segment consisting of a preset number of stacked laminations, comprising:

a) at least one blanking station for blanking a plurality of laminations from a sheet of ferromagnetic material, at least part of said laminations comprising at least one protruding engagement portion and at least one concave engagement portion having mutually complementary shapes to allow engagement with the complementary engagement portions of adjacent laminations, b) at least one stacking station comprising an accumulation chamber for progressively stacking said laminations and for forming a plurality of segments of said ferromagnetic core, and c) at least one forming station for forming in said blanking mold a rectilinear sequence of adjacent segments by coupling the protruding engagement portions of the laminations of a segment with the concave engagement portions of the laminations of another adjacent segment.

2. The blanking mold according to claim 1, wherein said forming station is placed beneath said stacking station to progressively receive said segments and connect them to each other during the advancement of the stacked laminations in said accumulation chamber.

3. The blanking mold according to claim 1, wherein said forming station includes at least one mobile conveyor upon which said rectilinear sequence of segments is arranged.

4. The blanking mold according to claim 1, wherein said at least one blanking station and said stacking station are placed in separate positions along the feed direction of said sheet in said blanking mold.

5. The blanking mold according to claim 1, wherein a further punching station is provided for plastically deforming at least one protruding portion of at least one of said laminations of each stack for coupling it via an interference fit to the concave engagement portion of at least one adjacent lamination.

* * * * *